United States Patent
Woo et al.

(10) Patent No.: US 8,253,722 B2
(45) Date of Patent: Aug. 28, 2012

(54) METHOD, MEDIUM, AND SYSTEM RENDERING 3D GRAPHICS DATA TO MINIMIZE POWER CONSUMPTION

(75) Inventors: Sang-oak Woo, Anyang-si (KR); Seok-yoon Jung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1027 days.

(21) Appl. No.: 11/889,329

(22) Filed: Aug. 10, 2007

(65) Prior Publication Data

US 2008/0100613 A1  May 1, 2008

(30) Foreign Application Priority Data

Oct. 27, 2006  (KR) .................. 10-2006-0105337

(51) Int. Cl.
*G06F 17/00* (2006.01)
*G06F 1/26* (2006.01)
*G06F 1/00* (2006.01)

(52) U.S. Cl. .................. 345/418; 713/320; 713/340
(58) Field of Classification Search .................. 345/419; 713/300–340
See application file for complete search history.

(56) References Cited

U.S. PATENT DOCUMENTS 7,426,320 B2 * 9/2008 Stevens .................. 382/307

FOREIGN PATENT DOCUMENTS

KR  10-0682456  2/2007

* cited by examiner

*Primary Examiner* — Hau Nguyen
(74) *Attorney, Agent, or Firm* — Staas & Halsey LLP

(57) ABSTRACT

A method, medium, and system rendering 3D graphics data. The method includes selecting objects to render from graphic data that have rendering results of a current frame that are different from rendering results of a previous frame, setting an operational voltage and an operational frequency based on the selected objects to render, and rendering the selected objects according to the set operational voltage and operational frequency with reference to the rendering results of the previous frame.

24 Claims, 9 Drawing Sheets

FIG. 4

| RENDERING REGION CHARACTERISTIC DATA || RENDERING VOLTAGE & FREQUENCY ||
|---|---|---|---|
| AREA & POSITION DATA | RENDERING OBJECT LIST | VOLTAGE | FREQUENCY |
| . . . . | . . . . | . . . . | . . . . |

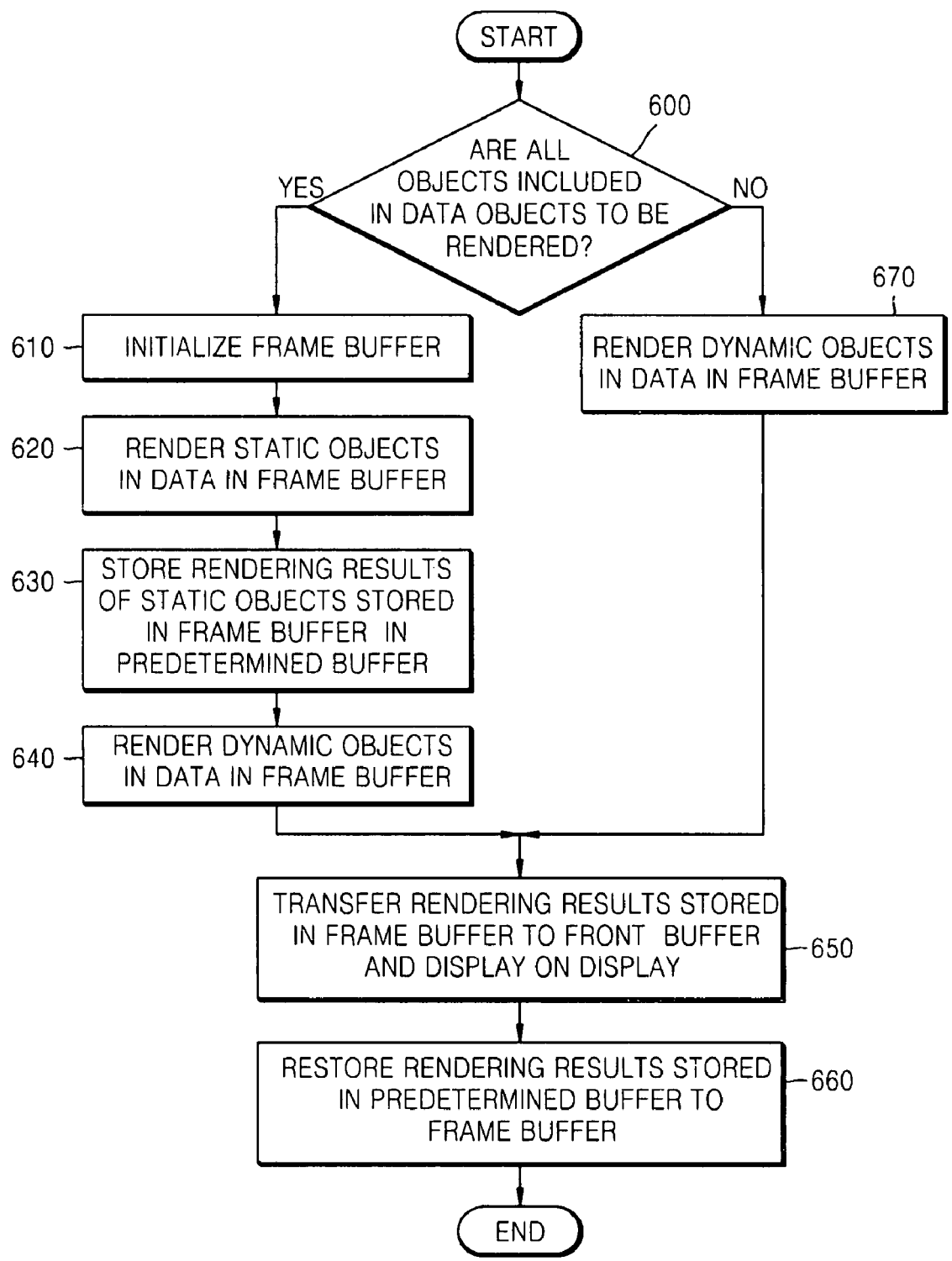

METHOD, MEDIUM, AND SYSTEM RENDERING 3D GRAPHICS DATA TO MINIMIZE POWER CONSUMPTION

CROSS-REFERENCE TO RELATED APPLICATIONS

This application claims the benefit of Korean Patent Application No. 10-2006-0105337, filed on Oct. 27, 2006, in the Korean Intellectual Property Office, the disclosure of which is incorporated herein in its entirety by reference.

BACKGROUND OF THE INVENTION

1. Field of the Invention

One or more embodiments of the present invention relate to a method, medium, and system rendering 3D graphics data, and more particularly, to a method, medium, and system minimizing power consumption during graphics data rendering.

2. Description of the Related Art

Generally, three-dimensional (3D) graphics data is input to a renderer in units of a frame.

In such rendering, first, when graphics data corresponding to the current frame is input, a rendering engine initializes a Z buffer for storing depth values for each pixel forming an image represented by the input data, and a back buffer for storing color values of each pixel. Here, the depth values within the Z buffer are typically normalized to a maximum depth value that the buffer is capable of expressing, and the color values of the back buffer are typically normalized to color values corresponding to the background of a finalized image.

Then, the rendering engine performs transformation, lighting, and rasterization processes on all the objects in the graphics data. The transformation process is a process for transforming 3D objects into two-dimensional (2D) objects, the lighting process is a process of expressing visual effects of the transformed objects with respect to light sources, and the rasterization process is a process of assigning accurate colors to each of the pixels forming the transformed objects.

In the rasterization process, the rendering engine calculates respective depth and color values for each pixel forming an object, compares the calculated depth values for each pixel to the corresponding depth values of the depth buffer and revises the values of the depth buffer to the depth values of the corresponding pixels when the calculated depth values indicate that the corresponding pixels are closer than represented by the depth values of the depth buffer from the current viewpoint, and revises the values in the color buffer to the color values of the corresponding pixels. In order to display only the visible objects in the image, a visibility test is performed for each pixel.

When the rasterization process for all the objects included in the input data is completed, the rendering engine transfers the color values of each pixel stored in the back buffer to a front buffer to display the rendered image on a screen. Then, when the graphics data of the next frame is input, the rendering engine again initializes the Z buffer and the back buffer, and repeats the transformation, lighting, and rasterization processes for the objects included in the input graphics data.

This type of processing of input graphics data is called a graphics pipeline. A characteristic of a graphics pipeline is that the speed of the entire pipeline is delayed when any delay occurs in one component of the pipeline during processing. Therefore, each rendering image is given a deadline, and power is supplied from a power supply unit to render a frame of data within each deadline, and display the rendering results on the display.

Recently, more portable devices such as mobile communication terminals that provide 3D graphics rendering are being manufactured. Because such portable devices have limited battery capacities, it is crucial that they operate in the lowest power consuming modes possible compared to wired devices, such as desktop computers, which typically are not as limited in capacities.

SUMMARY OF THE INVENTION

One or more embodiments of the present invention provide a method, medium, and system minimize power consumption during rendering by reducing the number of graphics data rendering operations and rendering graphics data according to a set rendering voltage and frequency, taking into account the reduced number of operations.

Additional aspects and/or advantages of the invention will be set forth in part in the description which follows and, in part, will be apparent from the description, or may be learned by practice of the invention.

To achieve the above and/or other aspects and advantages, embodiments of the present invention include a rendering method, including selecting objects, of a plurality of objects included in input graphic data, to render having rendering results of a current frame that are different from rendering results of a previous frame, setting an operational voltage and an operational frequency of at least one rendering element based on the selected objects, and rendering the selected objects according to the set operational voltage and operational frequency based on the rendering results of the previous frame.

To achieve the above and/or other aspects and advantages, embodiments of the present invention include a rendering system, including a rendering object selecting unit to select objects, of a plurality of objects included in input graphic data, to render, the rendering results of the selected objects for a current frame being different from corresponding rendering results of a previous frame, a voltage and frequency setting unit to set an operational voltage and an operational frequency of at least one rendering element of the rendering system to render the selected objects, and a renderer to render the selected objects according to the set operational voltage and operational frequency based on rendering results of the previous data.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 is a chart illustrating rendering regions and corresponding set values of rendering voltages and frequencies stored in a storage, such as the storage of FIGS. 1B and 1C;

FIG. 6 is detailed flowchart of operations 570 and 580 in FIG. 5B, according to an embodiment of the present invention.

DETAILED DESCRIPTION OF THE PREFERRED EMBODIMENTS

Figure 1A:
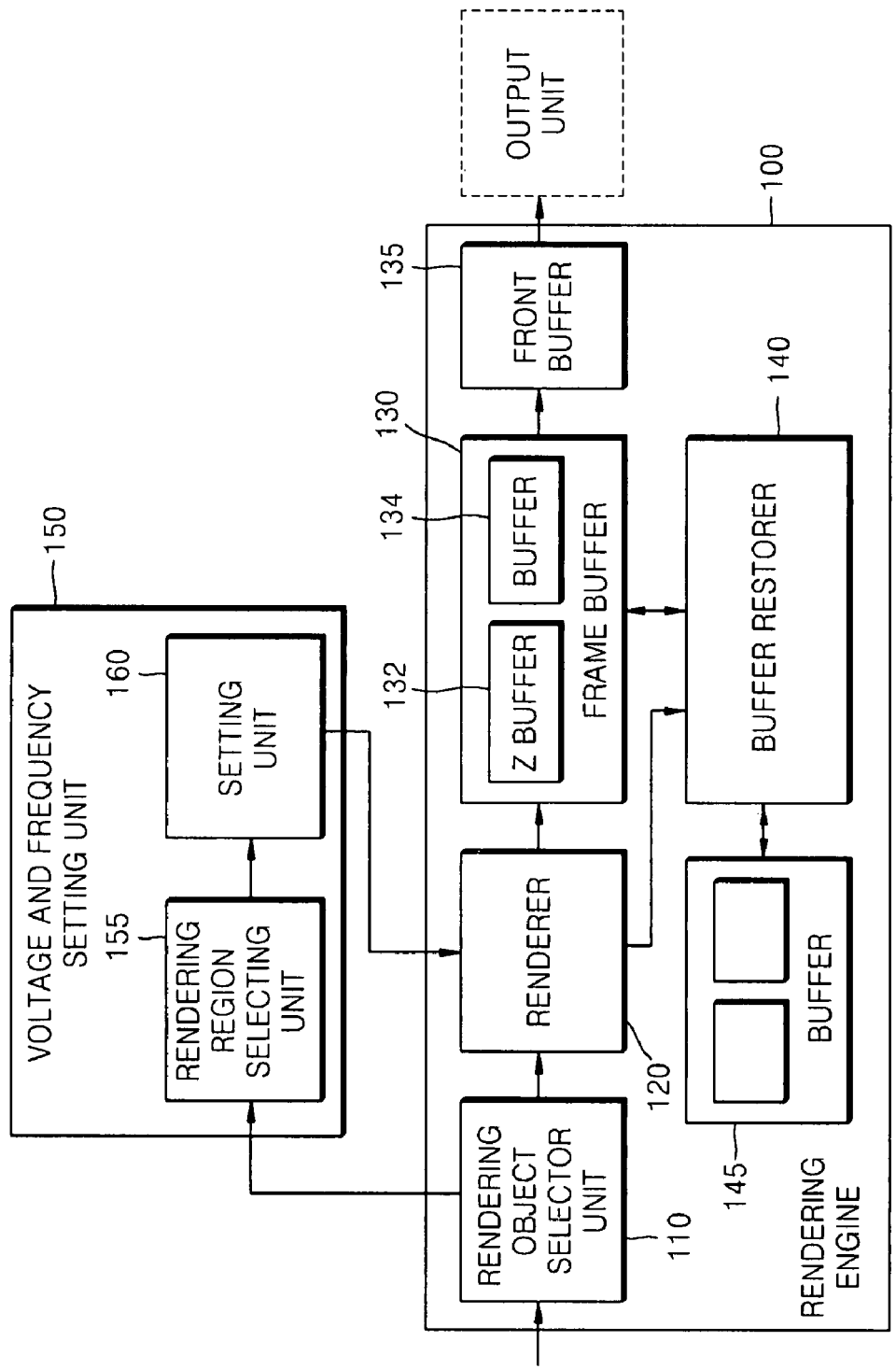
FIG. 1A illustrates a rendering system, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Korean Patent Application No. 10-2006-0012226, filed by the applicant of this invention, which is hereby incorporated by reference, discusses a technique for rendering with a reduced number of operations by considering the movement of objects included in the graphics data. Such a rendering technique reduces the number of operations during rendering, thereby increasing the rendering speed in frames per second (FPS) and reducing power consumption during rendering. However, when the rendering engine always operates at maximum capacity, not taking into account a reduction in operations during rendering, the rendering speed may increase beyond what is needed. Here, although the rendering resolution increases up to a certain rendering speed, an increase beyond that rendering speed does not produce further improvements in resolution. Therefore, a rendering speed that exceeds what is required unnecessarily consumes power. Thus, the inventors of the present invention have found it desirable to control the voltage and frequency of hardware that performs rendering to prevent rendering at a speed that is higher than what is needed.

Accordingly, a rendering method, medium, and system, according to one or more embodiments of the present invention, reduce operations during rendering, and control the operating voltage and operating frequency of the rendering engine that performs rendering, with due consideration for reducing the number of operations, so that power consumption can be minimized during rendering.

Below, rendering methods according embodiments of the present invention will be described with reference to FIGS. 1A through 1C, which illustrate a rendering engine 100, a voltage and frequency setting unit 150, and a rendering speed measuring unit measuring unit 190, for example.

Figure 1B:
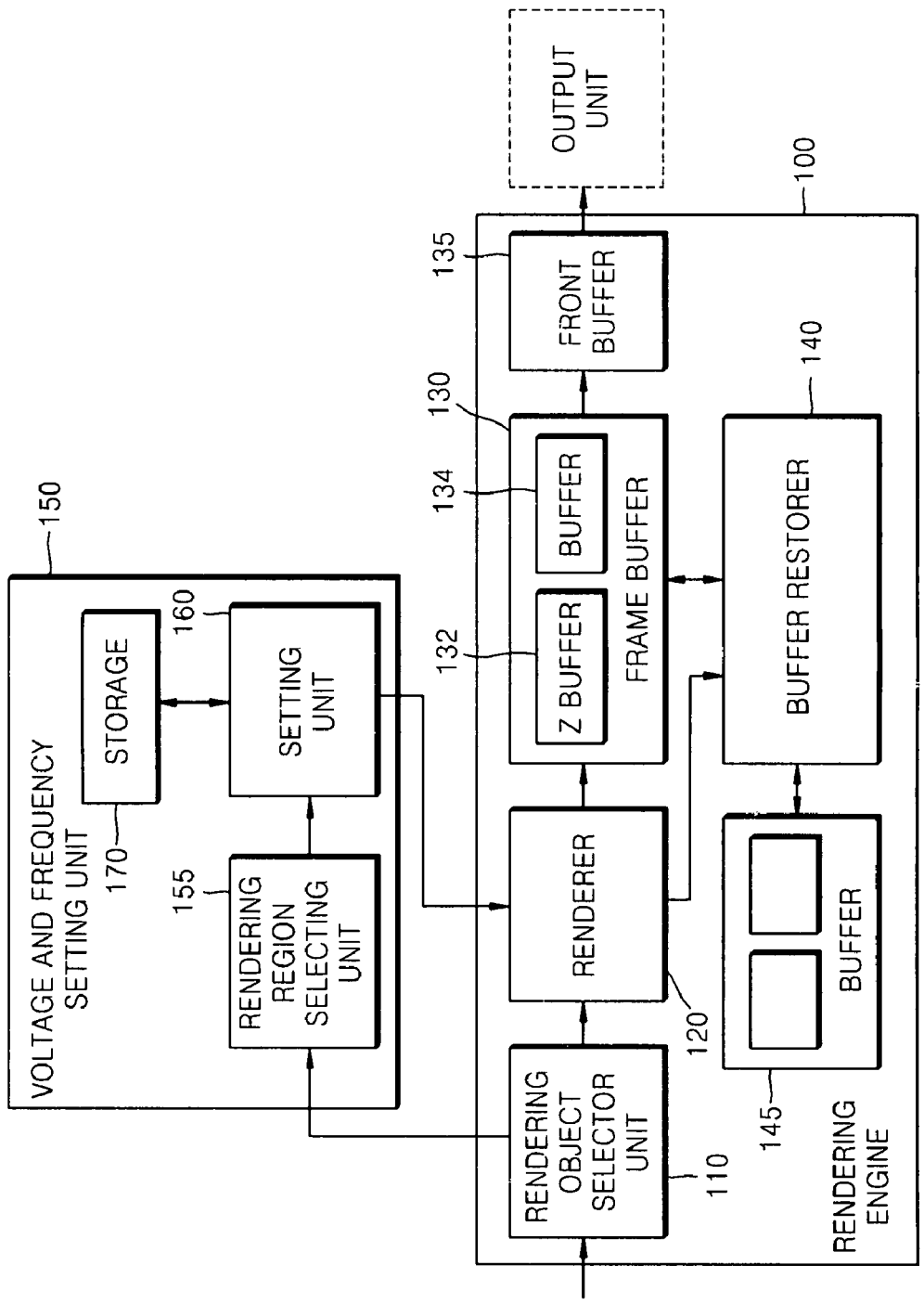
FIG. 1B illustrates a rendering system, according to a further embodiment of the present invention.
Figure 1C:
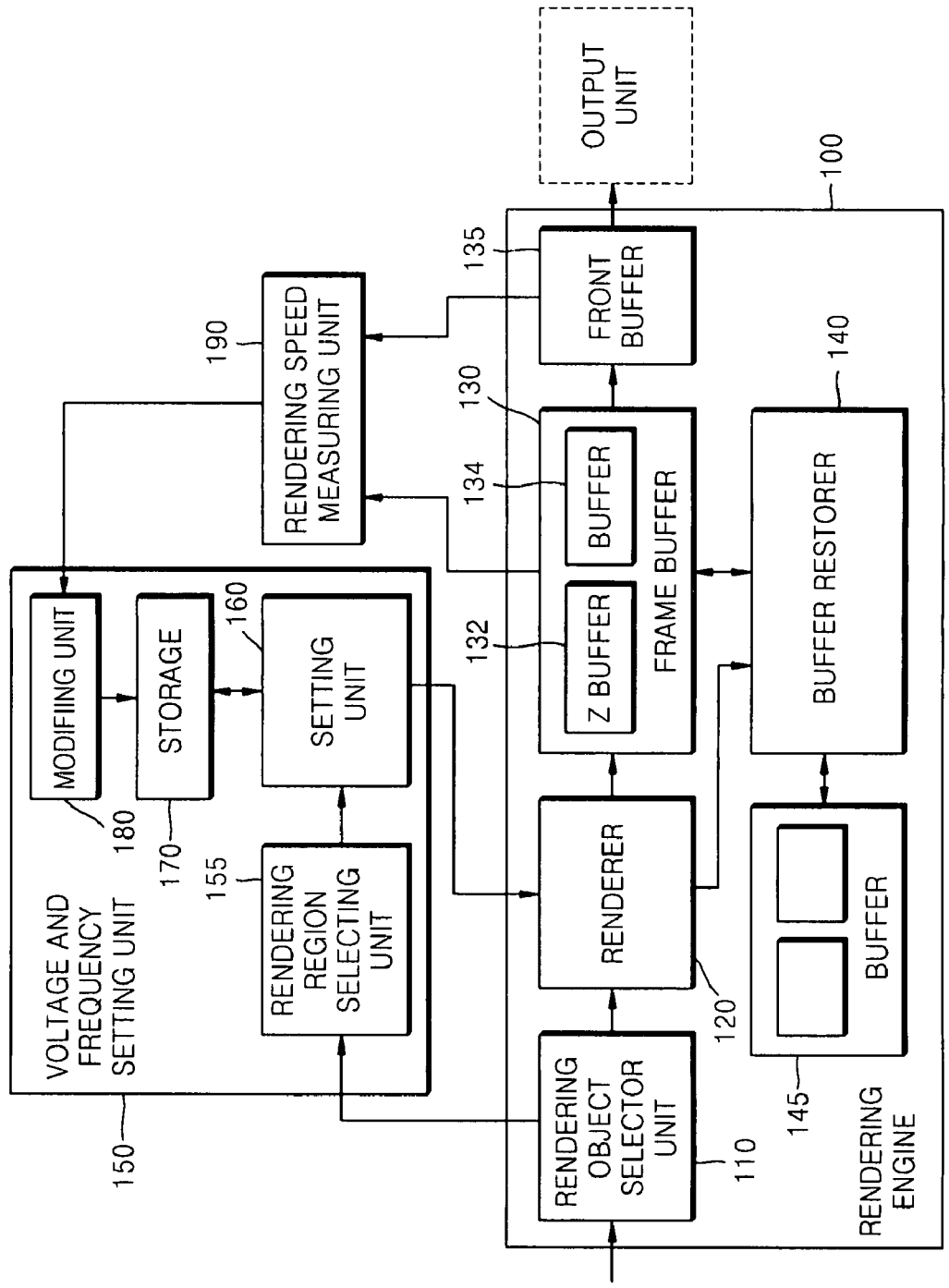
FIG. 1C illustrates a rendering system, according to still a further embodiment of the present invention.

As illustrated in FIG. 1A through 1C, the rendering engine 100 may include a rendering object selecting unit 110, a renderer 120, a frame buffer 130, a front buffer 135, and a buffer restoring unit 140. The voltage and frequency setting unit 150 may further include a setting unit 160, a storage 170, and a modifying unit 180.

Here, the rendering engine 100 may receive graphics data input in units of frames, perform an initial rendering of the input graphics data and renew a Z buffer 132 and a back buffer 134 included in the frame buffer 130. Then, when the rendering of all the objects included in the input data is completed, the rendering engine 100 may transfer the color values of each pixel stored in the back buffer 134 of the frame buffer 130 to the front buffer 135, and potentially display the rendered input graphics data on a display.

The rendering object selecting unit 110 may analyze the viewpoint of the input graphics data, discern between dynamic and static object from among the objects in the graphic data, and compile a list of each type of object. The graphic data viewpoint refers to the viewpoint of a camera or an observer that views the objects included in the graphics data.

Dynamic objects refer to 1) moving objects (in terms of position, direction, size, etc.), 2) objects whose property data changes (color data, material data, etc.), and 3) objects that are subjected to the influence of a changing light source (in terms of the light source's color, brightness, position, direction, etc.). Ultimately, dynamic objects include all objects that are different in appearance from the previous frame, i.e., objects whose rendering results are different from the rendering results in the previous frame.

Static objects refer to all objects from the input graphics data that are not dynamic objects—for example, 1) unmoving objects, 2) objects whose property data do not change, and 3) objects that are not subjected to the influence of changing light sources. Ultimately, static objects include all objects that are the same in appearance as in the previous frame, i.e., objects whose rendering results are the same as the rendering results in the previous frame.

The rendering object selecting unit 110 may initialize the analyzed data and select the objects to be rendered from the input data. An example detailed method used by the rendering object selecting unit 110 is described below.

Figure 2A:
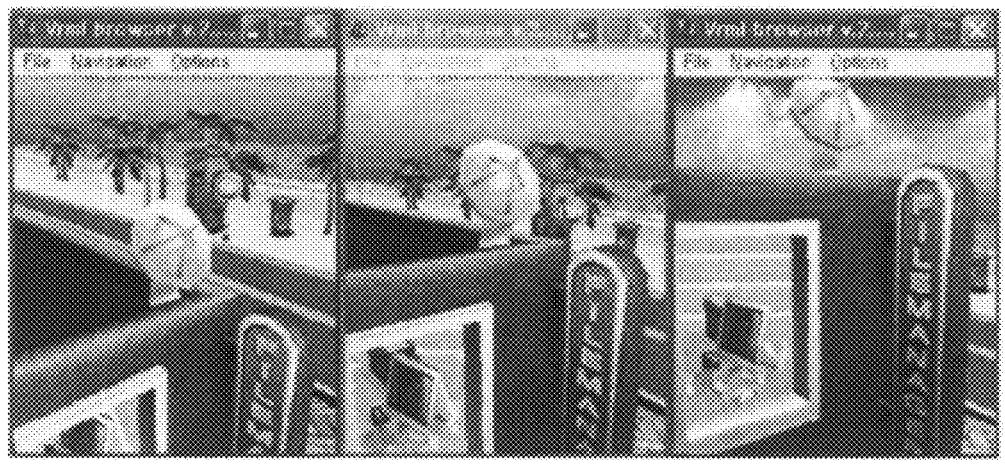
FIG. 2A illustrates displayed images of objects from changing viewpoints.

When at least one of the viewpoints of the data or the list of static images changes, the rendering object selecting unit 110 may select all the objects from the input data as rendering objects. FIG. 2A illustrates displayed images of objects from changing viewpoints. Referring to FIG. 2A, when the viewpoint of data is altered, i.e., if the viewpoint of the data is different from the previous frame or when the input data is data corresponding to a first frame, because the displayed image of both static and dynamic objects included in the input data is altered, all the objects must be rendered again.

When the viewpoint of the data is not altered, but there is a change in the static object list (for example, objects are added to the objects included in the list of static objects from the previous frame or some objects from the list of static objects from the previous frame are deleted), then the rendering results of the static objects of the previous frame and the rendering results of the static objects in the current frame are not the same, desiring re-rendering of all the objects.

Figure 2B:
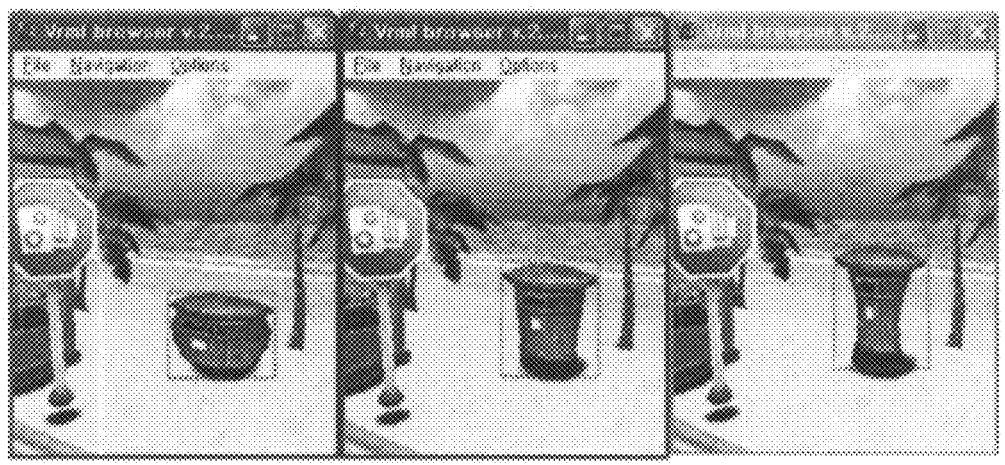
FIG. 2B illustrates displayed images of objects from a fixed viewpoint.

However, when the viewpoint of the data and the list of static objects are unchanged, the displayed image with rendered still objects from the current frame is the same as the displayed image with rendered still objects from the previous frame. Therefore, in this case, the rendering object selecting unit 110 may select only the dynamic objects from the input data as the objects to again render. FIG. 2B illustrates displayed images of objects from a fixed viewpoint. Referring to FIG. 2B, because the viewpoint remains the same, the displaying of the static objects does not change, and only the displaying of the dynamic objects may change. Accordingly, the static objects in the current frame may not be re-rendered, and the rendering results for the static objects in the previous frame may be used as the rendering results for the static objects in the current frame. In this way, the number of operations during rendering for embodiments of the present invention may be reduced.

When the selection of objects for rendering by the rendering object selecting unit 110 is completed, the rendering object selecting unit 110 can transfer the generated static object list and the dynamic object list together, for example, with the selected objects for rendering to the renderer 120, whereupon the renderer 120 renders the received objects for rendering and sends the rendered objects to the frame buffer 130.

First, when considering the case where all the objects included in the input data are selected for rendering, the renderer 120 renders all of the static objects and the dynamic objects received from the rendering object selecting unit 110.

Before the renderer 120 renders the objects, the frame buffer 130 is typically initialized. Here, the values of the Z buffer 132 can be revised to the maximum depth values that the Z buffer 132 is capable of expressing, and the values of the back buffer 134 can be revised to color values for the background of the image that is ultimately processed, for example.

After the initializing of the frame buffer 130, the renderer 120 may first render the static objects from among all the objects in the frame buffer 130. When the rendering of the static objects is completed, the depth values of each pixel are stored in the Z buffer 132 according to the rendering results of the static objects, and color values for each pixel stored in the back buffer 134 according to the rendering results of the static objects.

When the rendering of all the static objects is completed, the buffer restoring unit 140 (to be described later) may store a final rendering result of static objects in the frame buffer 130 in a restoration buffer 145, for example. A reason for storing the rendering results of the static objects in the restoration buffer is to use the rendering results of the static objects in the current frame again for the next frame, if the rendering results of the static objects in the next frame would be the same as the rendering results of the static objects in the current frame. This restoration buffer 145 may have a capacity corresponding to that of the Z buffer 132 plus the back buffer 134, e.g., in order to store all the depth values and the color values stored in the Z buffer 132 and the back buffer 134 of the frame buffer 130.

After the rendering results of the static objects are stored in the restoration buffer 145, the renderer 120 may render the dynamic objects in the frame buffer 130. Because the results of rendering the static objects are already stored in the frame buffer 130, all the rendering results included in the data are ultimately stored in the frame buffer 130, after the rendering of the dynamic objects in the frame buffer 130. When the rendering of the dynamic objects is completed, the renderer 120 can transfer the color values of each pixel stored in the back buffer 134 to the front buffer 135, and display the rendering results of the input data on the display.

As described above, after the renderer 120 renders the static objects, the buffer restoring unit 140 can store the rendering results of the static objects in the frame buffer 130 in the restoration buffer 145. Next, after the rendering results of the input data are displayed on the display, the buffer 140 can restore the rendering results of the static objects stored in the buffer 145 to the frame buffer 130. A reason for restoring the frame buffer 130 with the rendering results of the static objects in the buffer 140 is that if the viewpoint and static object list of the data in the following frame do not change, and the rendering results of the static objects of the current frame are the same as the rendering results of the static objects in the following frame, the rendering results of the static objects stored in the frame buffer 130 can be used as the rendering results of the static objects of the following frame, without performing rendering of the static objects in the following frame. That is, because rendering results corresponding to rendering results of static objects in the following frame are already stored in the frame buffer 130, there may be no need to perform rendering of the static objects in the following frame. Rendering only needs to be performed on the dynamic objects in the following frame in the frame buffer 130 to obtain results of having rendered both the dynamic objects and the static objects.

Below, the case where only the dynamic objects, included in the input data, are selected as objects for rendering, will be considered.

In this case, the renderer 120 may not initialize the frame buffer 130, but directly render the dynamic objects in the frame buffer 130. This is because, in this case, the rendering results of the static objects stored in the frame buffer 130 from the preceding frame can be used as the rendering results of the static objects for the current frame.

Then, after the renderer 120 renders all of the dynamic objects included in the data, the renderer 120 may transfer the color values of each pixel stored in the back buffer 134 to the front buffer 135, and display the rendering results of the input data on the display.

Here, because the buffer 140 may not render the static objects, it may not store rendering results of the static objects in the buffer 145. However, after the rendering of the dynamic objects is completed and the rendering results are displayed on the display, the buffer 140 may restore the rendering results stored in the buffer 145 to the frame buffer 130. Here, in such an embodiment, although the rendering results stored in the buffer 145 are the rendering results of the static objects in the previous frame, the rendering results of the static objects in the current frame have been determined to be the same as the rendering results of the static objects in the previous frame, and thus, restoring the rendering results stored in the buffer 145 to the frame buffer 130 produces the same results as restoring the rendering results of the static objects in the current frame to the frame buffer 130.

As described, according to one or more embodiments of the present invention, when considering the viewpoint and the list of static objects in the data, and selectively rendering only objects that require rendering among the objects included in the data, the needless repeating of operations can be avoided, so that the number of operations during rendering can be minimized. Specifically, objects that have the same displayed image as in the previous frame are not rendered again, and the rendering results obtained in the previous renderings are used again, so that needless repetition of operations during rendering can be minimized.

However, even if the number of operations during rendering is minimized, when the rendering engine that performs rendering is operated at full capacity, the rendering speed may still increase beyond what is necessary, which causes unnecessary consumption of power. Therefore, according to one or more embodiments of the present invention, a dynamic voltage scaling (DVS) technique may be used in order to minimize rendering operations and minimize the amount of power consumed by the rendering engine while performing the selective rendering.

Herein, DVS is a technique of using a low power consumption hardware to lower power consumption by lowering the voltage and/or frequency supplied during the occurrence of idle time when a predetermined operation is completed at a faster rate than a reference speed, thereby reducing the overall power consumed. Here, dynamic power consumption of a semiconductor device is reduced when a supplied voltage or a critical voltage is reduced. However, when the supplied voltage is reduced, a propagation delay for processing a predetermined operation increases, necessitating the lowering of an operational frequency to operate the hardware stably. Therefore, the reduction in the supplied voltage can be accompanied by a reduction in the operational frequency.

Figure 3A:
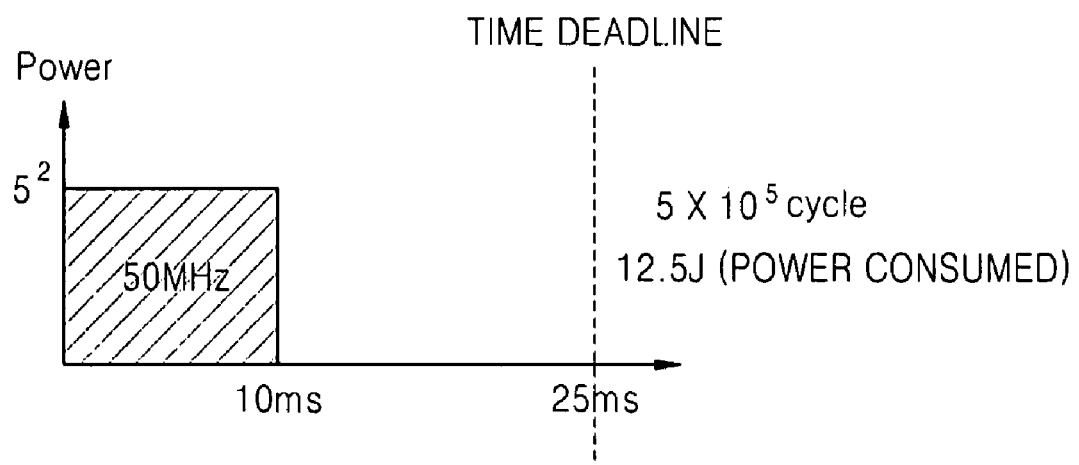
FIGS. 3A and 3B are graphs illustrating a kinetic energy scaling technique.
Figure 3B:
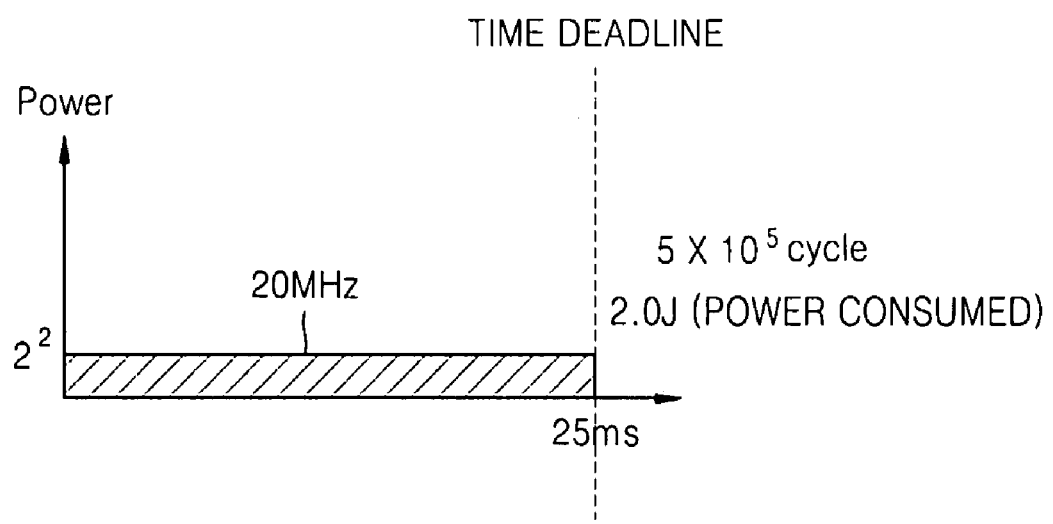

FIGS. 3A and 3B are graphs illustrating a kinetic energy scaling technique.

As noted above, when a series of processes are performed through a pipeline, a delay in one process slows the overall speed of the pipeline. Therefore, a deadline is assigned for each process, within which the respective processes must be completed.

FIG. 3A shows a predetermined process being performed with a deadline of 25 ms, at $5\times10^5$ cycles, an operational frequency of 50 Mhz, and 5V supplied to the device. The process is completed in 10 ms, and the remaining 15 ms of the deadline is idle time in which the device does not operate. Here, the predetermined process consumes 12.5 J of energy. However, referring to FIG. 3B, where DVS is used, a frequency of 20 Mhz at 2V is supplied to the device in order to complete the process by the deadline. If the process is completed within 25 ms, the energy used is 2 J, resulting in a drastic reduction in power consumption.

By thus making adjustments to the operational voltage and frequency, based on the respective deadlines, power consumption can be reduced. Accordingly, this DVS technique may be applied to a rendering engine that renders graphics data. In this case, the deadline of the rendering process is made to be a maximum time allotted for processing one frame. The time it takes to process one frame may be calculated using a rendering speed in frames per second (FPS), for example. To obtain a predetermined resolution, the rendering speed must not fall below a predetermined reference speed. Thus, when a predetermined reference speed is used, the deadline for rendering one frame can be determined. That is, the rendering engine 100 may adjust the operational voltage and frequency, for example, to render one frame by a deadline, so that power consumption can be minimized.

Below, a method of minimizing power consumption during rendering by adjusting the operational voltage and frequency of the rendering engine 100, for example, by the voltage and frequency setting unit 150, also as an example, according to an embodiment of the present invention, will now be described in greater detail.

The voltage and frequency setting unit 150 may receive objects for rendering selected by the rendering object selecting unit 110, set a voltage and a frequency for minimizing power consumption by the rendering engine based on the number of operations for the initial rendering, for example, and provide these to the renderer 120 of the rendering engine 100 to dynamically control the voltage and frequency supplied to the rendering engine 100.

The voltage and frequency setting unit 150 may further receive objects for rendering from the rendering object selecting unit 110, refers to the received data for rendering objects to consider the size of areas taken up by the rendering objects on the display and the size of data corresponding to the objects for rendering when setting the rendering voltage and frequency.

If both static objects and dynamic objects are selected as objects for rendering, the entire display may become the region for the rendering objects, and the size of the data corresponding to the objects for rendering could become the entirety of the input data. Here, if the entirety of the objects included in the input data are selected as objects for rendering, the voltage and frequency setting unit 150 may directly set the rendering voltage and frequency to their maximum values, without performing additional operations such as detecting the entire area of the objects to be rendered or calculating the size of data corresponding to all the objects, so that the process of setting the voltage and frequency can be simplified.

Below, operation of the voltage and frequency setting unit 150, according to one or more embodiments of the present invention, will be described in greater detail.

First, in an operation of the voltage and frequency setting unit 150, according to an embodiment, the voltage and frequency setting unit 150 may include a rendering region selecting unit 155 and a setting unit 160, for example, as shown in any of FIGS. 1A through 1C.

The rendering region selecting unit 155 may receive objects for rendering, e.g., as selected by the rendering object selecting unit 110, and use the received objects to select rendering regions corresponding to the selected objects for rendering.

The setting unit 160 may refer to the rendering region selected by the rendering region selecting unit 155, and set the values for the operational voltage and the operational frequency of the rendering engine 100. Here, in an embodiment, the setting unit 160 may refer to the area of the rendering region, the position, and the selected rendering objects corresponding to the rendering region, calculate the set values for the operational voltage and frequency, and set the operational voltage and frequency of the rendering engine 100 according to the calculated set values.

For example, when the operational voltage and frequency of the rendering engine 100 are set according to the area of the rendering region, the setting unit 160 may measure the area of the selected rendering region, and calculate the set values of the rendering voltage and frequency according to the measured area size.

However, in other embodiments, besides the area of the rendering region, the position of the rendering region, the corresponding rendering objects, etc., may also or alternatively be taken into account when calculating the set values of the operational voltage and frequency of the rendering engine 100, and the operational voltage and frequency of the rendering engine 100 may be set according to the calculated set values.

In addition, set values that satisfy the operating specifications of the rendering engine 100 may be preset, and optimum values for the rendering engine 100 (e.g., values for the lowest energy consumption selected from a plurality of selected set values) may be selected only when the operational voltage and frequency satisfy predetermined requirements and the rendering engine 100 operates reliably. Thus, depending on embodiment, the operational voltage and frequency of the rendering engine 100 may be selected accordingly.

The operation of the voltage and frequency setting unit 150, according to another embodiment of the present invention, will now be described. Here, as illustrated in FIGS. 1B and 1C, the frequency setting unit 150 may further include a storage 170, for example.

The storage 170 may pair and store characteristics of the rendering region selected by the rendering region selecting unit 155, for example, with corresponding set values of the rendering voltage and frequency calculated by the setting unit 160, also as an example. FIG. 4 is a chart identifying example rendering regions and corresponding example set values of rendering voltages and frequencies stored in the storage 170. Referring to the chart in FIG. 4, the position, area, and corresponding rendering objects of the rendering region, may be stored as characteristic data of the rendering region. However, in another embodiment of the present invention, only one of the position, area, and corresponding rendering objects of the rendering region may be stored as characteristic data, or other characteristic data on the rendering region may be added.

According to an embodiment, such as illustrated in FIG. 1B, the setting unit 160 may first search for set values of the operational voltage and frequency corresponding to the characteristics of the rendering region in the storage 170, and when the search results show that set values corresponding to the characteristics of the selected rendering region are in the storage 170, the setting unit 160 may set the operational voltage and frequency of the rendering engine 100 to the set values found by the searching. However, when the search results show that corresponding set values are not present in the storage 170, the selected rendering region may be referenced, as above, to directly calculate set values of the operational voltage and frequency, and set the operational voltage and frequency of the rendering engine 100 with the calculated values.

In addition, here, by further including the storage 170, the operational voltage and the operational frequency may be more effectively set.

Below, an operation of a voltage and frequency setting unit 150, according to a further embodiment of the present invention, will be described. Here, the voltage and frequency setting unit 150 may further include a modifying unit 180, and the renderer may further include a rendering speed measuring unit measuring unit 190, such as illustrated in FIG. 1C.

The rendering speed measuring unit 190 may measure the rendering speed of the input graphics data. As an example, the rendering speed measuring unit 190 may measure the time it takes for the front buffer 135 to be revised or the time it takes for a single frame image to be displayed on the display, and can calculate the graphics data rendering speed (the number of frames rendered per second, for example) by taking the inverse of the measured time.

The modifying unit 180 may compare the actual rendering speed of the input graphics data, e.g., calculated by the rendering speed measuring unit 190, to an optimum reference speed for rendering graphics data while minimizing power consumption of the rendering engine 100, and revises the sizes of the rendering voltage and frequency stored in the storage 170 according to the comparison results.

For example, when a comparison of the actual measured rendering speed to the optimum reference speed indicates that the measured rendering speed is faster than the reference speed, the rendering speed is unnecessarily high, indicating a need to lower the supplied voltage to the rendering engine 100 and the operational frequency of the rendering engine 100. Accordingly, sizes of the operational voltage and frequency stored in the storage 170 may be revised to lower values in order to set values for the operational voltage and frequency under subsequently similar conditions.

Therefore, in this embodiment, even if the setting unit 160 does not set the operational voltage and frequency of the rendering engine 100 to the optimum set values for the operational voltage and frequency in order to minimize power consumption by the rendering engine 100, the modifying unit 180 may continuously repeat this revising process so that in the subsequent processes the setting unit 160 can set the values of the operational voltage and frequency close to the optimum values for minimizing power consumption by the rendering engine 100, thereby minimizing the rendering engine's 100 consumption of power.

Below, a rendering method, according to an embodiment of the present invention, will be described with reference to FIGS. 5A through 5B.

In operation 500, the viewpoint of the input graphics data is analyzed, dynamic objects are separated from static objects in the data, and respective lists of the two types of objects are compiled.

Here, the viewpoint of the data refers to the viewpoint of a camera or an observer viewing the objects included in the data, i.e., from the perspective of such a camera or observer. As noted above, dynamic objects herein refer to 1) moving objects (in terms of position, direction, size, etc.), 2) objects whose property data changes (color data, material data, etc.), and 3) objects that are subjected to the influence of a changing light source (in terms of the light source's color, brightness, position, direction, etc.). Ultimately, dynamic objects include all objects that are different in appearance from the previous frame (that is, objects whose rendering results are different from the rendering results in the previous frame). The static objects herein refer to all objects from among the objects included in the input graphics data that are not dynamic objects—for example, 1) unmoving objects, 2) objects whose property data do not change, and 3) objects that are not subjected to the influence of changing light sources. Ultimately, static objects include all objects that are the same in appearance as the previous frame (that is, objects whose rendering results are the same as the rendering results in the previous frame).

In operation 510, objects for rendering are selected from among the objects included in the data, according to whether or not there is a change in the viewpoint or the static object list of the data.

When there is a change in at least one of the viewpoint or the static object list of the data, all the objects included in the input data may be selected as objects to be rendered; and when there are no changes to the viewpoint or the static object list of the data, only the dynamic objects from the input data may be selected as objects for rendering. When the viewpoint or the static object list of the data changes between frames, for example, the rendering results of the static objects in the previous data may not be used for the rendering of static objects in the current data, and thus all objects included in the data may be re-rendered.

In operation 520, a rendering region may be selected for the objects that have been selected for rendering.

In operation 530, a set value corresponding to the rendering region selected from the memory that stores the rendering region and the corresponding rendering voltage and frequency set values may be searched for. When a set value corresponding to the selected rendering region is found in the search of operation 530, operation 540 may be performed; and if a set value is not found, operation 550 performed.

In operation 540, the rendering voltage and frequency may be set according to the found set value. In operation 550, the rendering system may further refer to the selected rendering region to calculate the set values for the rendering voltage and frequency, and store the selected rendering region and the corresponding calculated set values for the rendering voltage and frequency in the memory.

In operation 560, the calculated set values may be selected as the rendering voltage and frequency.

In operation 570, the objects for rendering may then be rendered according to the set rendering voltage and frequency in operation 540 or 560 in the frame buffer, and the rendering results displayed on the display, for example.

In operation 580, the rendering results of the static objects included in the data may be restored to the frame buffer.

In operation 590, the data rendering speed may be measured, and the set values of the rendering voltage and frequency corresponding to the selected rendering region stored in the memory revised, according to the comparison results of the measured rendering speed and a predetermined reference speed, for example.

Figure 5A:
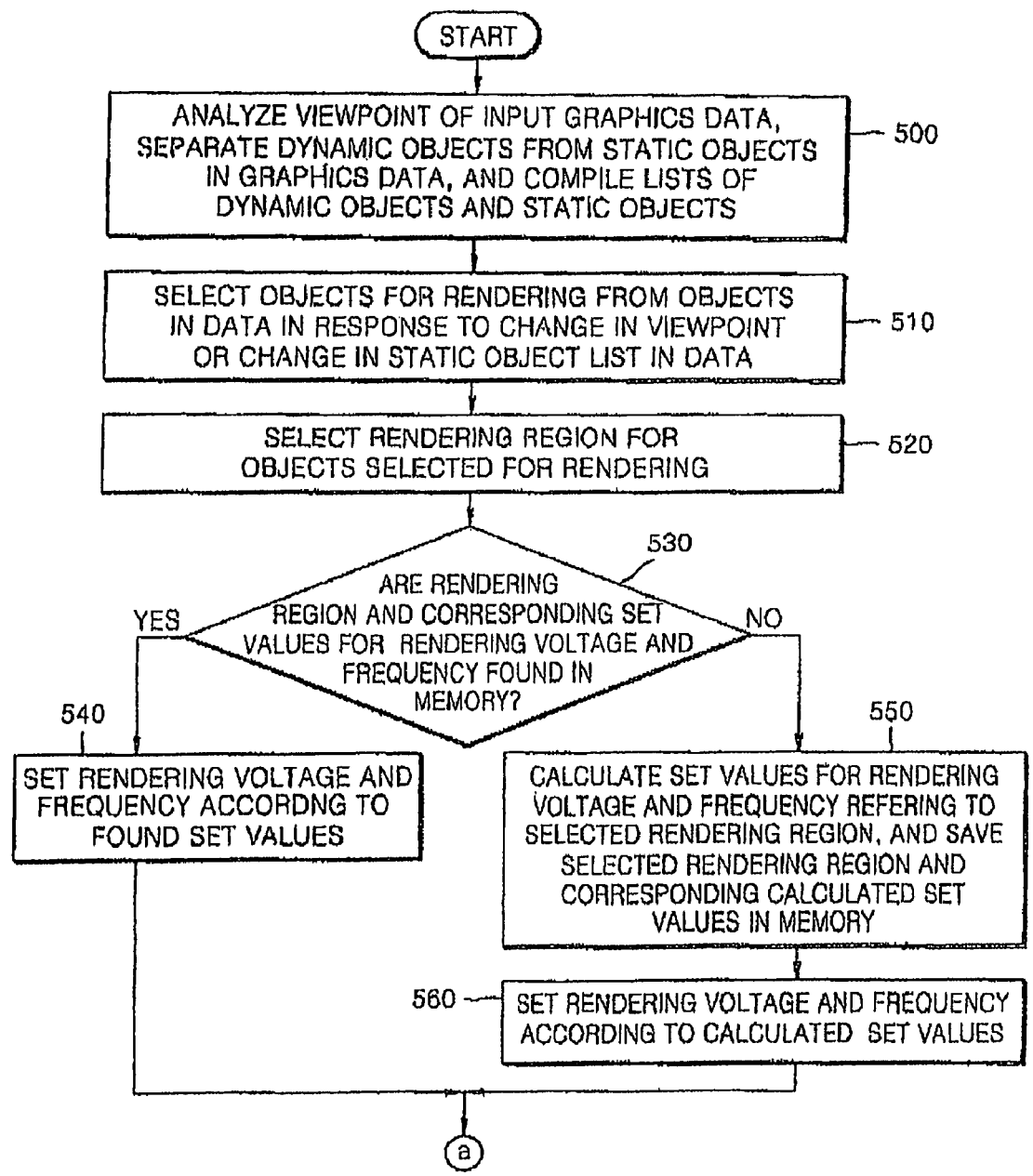
FIGS. 5A-5B illustrate a rendering method, according to an embodiment of the present invention.
Figure 5B:
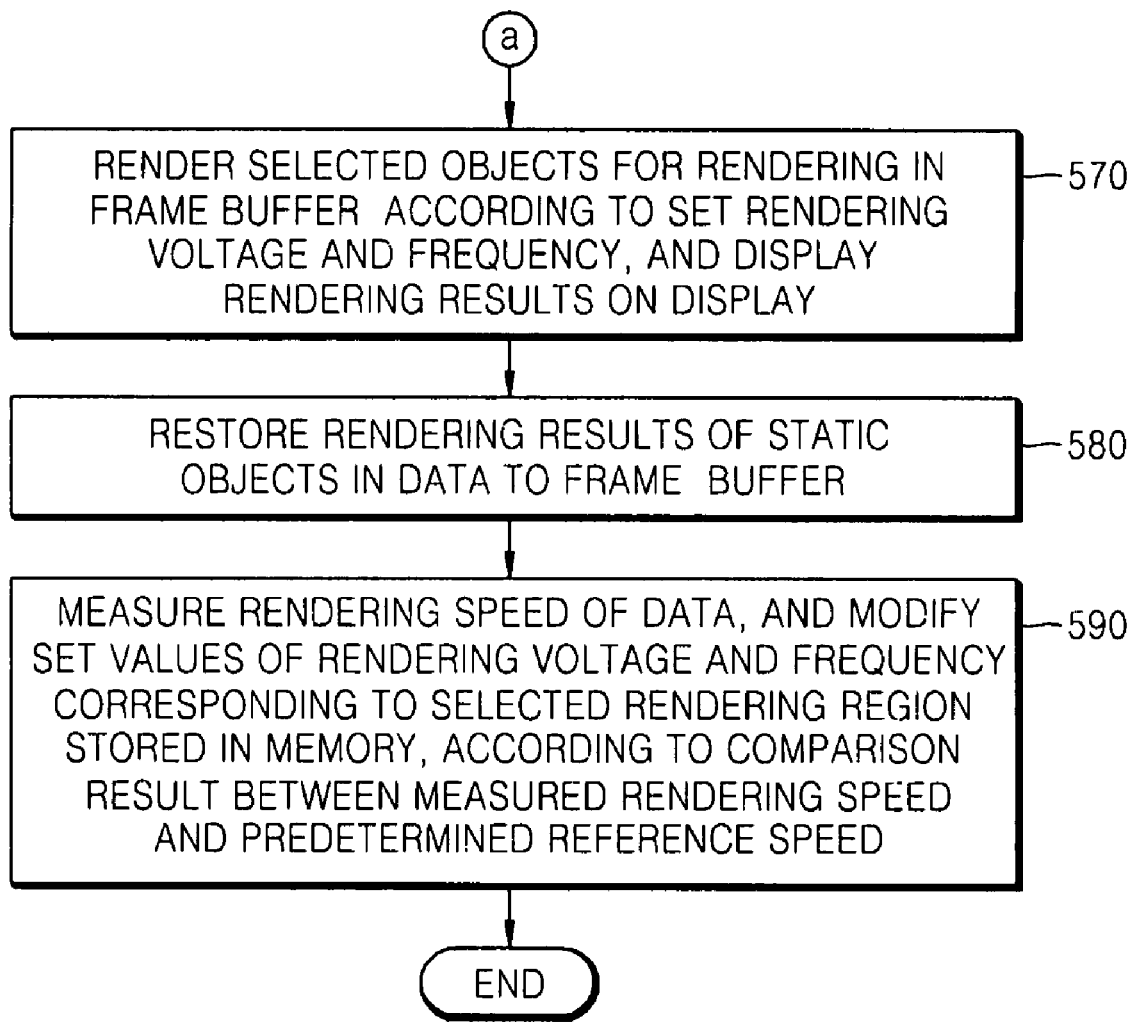

In the embodiment illustrated in FIGS. 5A through 5B, for example, when all the objects included in the data are selected as objects to be rendered in operation 510, the rendering voltage and frequency are set in operations 520 through 570. However, in other embodiments of the present invention, when all the objects included in the data are selected as objects to be rendered in operation 510, a maximum value that allows the rendering voltage and frequency to be set may be directly set.

FIG. 6 is detailed flowchart of operations 570 and 580 in FIG. 5B, according to an embodiment of the present invention.

In operation 600, it may be determined whether the objects to be rendered include all the objects in the input data. If it is determined in operation 600 that the objects to be rendered are all the objects included in the data, operation 610 is performed.

In operation 610, the frame buffer may be initialized.

In operation 620, the static objects in the data in the initialized frame buffer may be rendered.

In operation 630, the rendering results of the static objects stored in the frame buffer may be saved, e.g., in a restoration buffer 145.

In operation 640, the dynamic objects in the data in the frame buffer may be rendered.

In operation 650, the rendering results in the frame buffer may be transferred to the front buffer, and results displayed on the display.

In operation 660, the rendering results stored in the buffer 145, for example, may be restored to the frame buffer.

When only the dynamic objects from the data are determined as objects to be rendered in operation 600, i.e., there are static objects to currently be displayed that have previously been rendered, operation 670 may be performed.

In operation 670, the dynamic objects included in the data in the frame buffer may be rendered, and operation 650 performed.

Accordingly, as noted above, in conventional rendering processes, the Z buffer and back buffer need to be initialized for each frame, and the buffers forming the memory have to be accessed to change the depth values and the color values for each pixel to initialized values, thus consuming a lot of power. Further, because all objects displayed on the display for each frame have to be rendered, a large amount of power is consumed in the rendering process.

However, when a camera viewpoint or the viewpoint of an observer remains unchanged or changes infrequently, as in a 3D graphic user interface (GUI), there are many objects that do not change from the previous displayed frame to the current displayed frame. Thus, in this case, a conventional rendering method would repeat the same process by re-rendering objects that are displayed the same in the current frame as in the previous frame, thereby reducing rendering speed and increasing power consumption during rendering, resulting in inefficiency.

However, as described above, according to one or more embodiments of the present invention, objects to be rendered may be selected from only objects in the data that have changed, e.g., according to movement of a viewpoint or objects in the data, and only objects selected for rendering may be rendered, thereby reducing the number of operations during rendering. Furthermore, by referring to the selected objects for rendering and setting the rendering voltage and frequency, the objects selected for rendering may be rendered according to the selected rendering voltage and frequency, thereby minimizing the power consumed during data rendering.

Still further, a rendering region selected according to the selected rendering objects and the set values of the rendering voltage and frequency corresponding to the rendering region may be saved, the actual rendering results analyzed, and the saved set values revised so that the rendering speed approaches a predetermined reference speed. Thus, in an embodiment, in order to minimize the power consumed by a rendering system, the voltage and frequency may be adjusted to an optimum voltage and frequency level.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, a rendering method, medium, and system, according to one or more embodiments of the present invention, selects objects for rendering according to a viewpoint and static object list of input data, and performs rendering in such a manner that operations performed during rendering are minimized. In addition, by considering the selected objects for rendering, and performing rendering of the selected objects for rendering according to a set voltage and frequency, the power consumed during rendering can be minimized. Embodiments of the present invention may especially be low power-consuming devices such as mobile devices, when performing 3D graphic data rendering.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A rendering method, comprising:
   identifying for dynamic and static objects in a plurality of objects included in input graphic data of a current frame;
   selecting objects, from the plurality of objects to render, the selected objects including the dynamic objects whose rendering results in the current frame are different from corresponding rendering results in a previous frame;
   setting an operational voltage and an operational frequency of at least one rendering element based on the selected objects; and
   rendering the selected objects according to the set operational voltage and operational frequency based on the rendering results of the previous frame.

2. The rendering method of claim 1, further comprising outputting, for all objects of the current frame, a combination of results of the rendering of the selected objects and restored rendering results, from the previous frame, of static remaining objects included in the plurality of objects selectively not included in the selected objects.

3. The rendering method of claim 1, wherein the setting of the operational voltage and the operational frequency comprises setting the operational voltage and the operational frequency at respective maximum values within a setting range when all objects in the input graphic data are selected as the objects to render.

4. The rendering method of claim 1, wherein the setting of the operational voltage and the operational frequency comprises:
selecting a rendering region on a display based on regions on the display covered by the selected objects; and
setting the operational voltage and the operational frequency according to the selected rendering region.

5. The rendering method of claim 4, wherein the rendering region is a multi-sided or circular region covering a minimum area of the display and includes the selected rendering objects.

6. The rendering method of claim 4, wherein the setting of the operational voltage and the operational frequency further comprises:
calculating set values of the operational voltage and the operational frequency based on characteristics of the selected rendering region; and
setting the operational voltage and the operational frequency according to the calculated set values.

7. The rendering method of claim 6, further comprising measuring a rendering speed of the selected objects, and modifying the calculated set values corresponding to the characteristics of the selected rendering region according to results of a comparison between the measured rendering speed and a predetermined reference speed.

8. The rendering method of claim 6, wherein the setting of the operational voltage and the operational frequency further comprises:
storing the characteristics of the selected rendering region and the calculated set values corresponding to the characteristics of the selected rendering region in a predetermined memory.

9. The rendering method of claim 8, wherein the setting of the operational voltage and the operational frequency further comprises:
searching for recorded set values corresponding to the characteristics of the selected rendering region in the predetermined memory, as found set values; and
setting the operational voltage and the operational frequency according to the found set values found by the searching for the recorded set values when set values corresponding to the characteristics of the selected rendering region are found in the predetermined memory.

10. The rendering method of claim 9, further comprising measuring a rendering speed of the selected objects, and modifying the found set values corresponding to the characteristics of the selected rendering region according to results of a comparison between the measured rendering speed and a predetermined reference speed.

11. The rendering method of claim 10, wherein, in the measuring of the rendering speed, and the modifying of the found set values, the found set values are modified in a first one of increased and decreased directions when the measured rendering speed is faster than the predetermined reference speed, and the found set values are modified in a second one of the increased and decreased directions, different from the first direction, when the measured rendering speed is slower than the predetermined reference speed.

12. The rendering method of claim 11, wherein the setting of the operational voltage and the operational frequency is based on a data size of data of the selected objects.

13. The rendering method of claim 1, wherein in the selecting of the objects to render, all objects included in the graphic data are selected as the objects to render when the graphic data has a viewpoint that is different from a viewpoint of graphic data of the previous frame.

14. At least one non-transitory recording medium comprising computer-readable code to control at least one processing element to implement the method of claim 1.

15. The rendering method of claim 1, wherein the identifying for the dynamic and static objects includes identifying as the static objects one or more objects of the plurality of objects for which a respective appearance in the current frame would not change from the previous frame resulting in respective rendering results for the one or more objects in the previous frame being considered equal to respective rendering results of the one or more objects in the current frame.

16. A rendering method, comprising:
selecting objects, of a plurality of objects included in input graphic data, to render whose rendering results in a current frame are different from corresponding rendering results in a previous frame;
setting an operational voltage and an operational frequency of at least one rendering element based on the selected objects; and
rendering the selected objects according to the set operational voltage and operational frequency based on the rendering results of the previous frame,
wherein in the selecting of the objects to render, all objects included in the graphic data are selected as objects to render, when a list of static objects included in the graphic data is different from a list of static objects included in graphic data of the previous frame, the static objects being objects whose data does not change between the current frame and the previous frame.

17. A rendering method, comprising:
selecting objects, of a plurality of objects included in input graphic data, to render whose rendering results in a current frame are different from corresponding rendering results in a previous frame;
setting an operational voltage and an operational frequency of at least one rendering element based on the selected objects; and
rendering the selected objects according to the set operational voltage and operational frequency based on the rendering results of the previous frame,
wherein in the selecting of the objects to render, dynamic objects included in the graphic data are selected as objects to render, when a viewpoint of the graphic data is identical to a viewpoint of graphic data of the previous frame, and a list of static objects included in the graphic data is identical to a list of static objects included in the graphic data of the previous frame, the dynamic objects being objects whose data changes between the current frame and the previous frame, and the static objects being objects whose data does not change between the current frame and the previous frame.

18. A rendering system, comprising:
a rendering object selecting unit to identify for dynamic and static objects in a plurality of objects included in input graphic data of a current frame, and to select objects from the plurality of objects to render, the selected objects including the dynamic objects whose rendering results in the current frame are different from corresponding rendering results in a previous frame;

a voltage and frequency setting unit to set an operational voltage and an operational frequency of at least one rendering element of the rendering system to render the selected objects; and a renderer to render the selected objects according to the set operational voltage and operational frequency based on rendering results of the previous data.

19. The rendering system of claim 18, wherein the render outputs, for all objects of the current frame, a combination of results of the rendering of the selected objects and restored rendering results, from the previous frame, of static remaining objects included in the plurality of objects selectively not included in the selected objects.

20. The rendering system of claim 18, wherein, when all objects included in the input graphic data are selected as the objects to render, the voltage and frequency setting unit sets the operational voltage and the operational frequency at respective maximum values within a setting range.

21. The rendering system of claim 18, wherein the voltage and frequency setting unit comprises:
 a rendering region selecting unit to select a rendering region on a display based on an area of the display covered by the selected objects; and
 a setting unit to calculate set values for the operational voltage and the operational frequency based on characteristics of the selected rendering region, and to set the operational voltage and the operational frequency according to the calculated set values.

22. The rendering system of claim 18, wherein the voltage and frequency setting unit further comprises a storage to store characteristics of the selected rendering region and calculated set values corresponding to the characteristics, wherein the setting unit searches within the storage unit for recorded set values corresponding to the selected rendering region, as found set values, and sets the operational voltage and the operational frequency according to the found set values.

23. The rendering system of claim 22, further comprising a rendering speed measuring unit to measure a rendering speed of the selected objects, wherein the voltage and frequency setting unit further includes a modifying unit to modify the found set values corresponding to the characteristics of the selected rendering region in the storage, according to comparison results of the measured rendering speed and a predetermined reference speed.

24. A rendering system, comprising:
 a rendering object selecting unit to select objects, of a plurality of objects included in input graphic data, to render, the rendering results of the selected objects in a current frame being different from corresponding rendering results in a previous frame;
 a voltage and frequency setting unit to set an operational voltage and an operational frequency of at least one rendering element of the rendering system to render the selected objects; and
 a renderer to render the selected objects according to the set operational voltage and operational frequency based on rendering results of the previous data,
 wherein the rendering object selecting unit further identifies the plurality of objects included in the input graphic data, including identifying one or more objects of the plurality of objects for which a respective appearance in the current frame would not change from the previous frame resulting in respective rendering results for the one or more objects in the previous frame being considered equal to respective rendering results of the one or more objects in the current frame.

* * * * *

UNITED STATES PATENT AND TRADEMARK OFFICE
CERTIFICATE OF CORRECTION

PATENT NO. : 8,253,722 B2   Page 1 of 1
APPLICATION NO. : 11/889329
DATED : August 28, 2012
INVENTOR(S) : Sang-oak Woo et al.

It is certified that error appears in the above-identified patent and that said Letters Patent is hereby corrected as shown below:

Column 12, Line 52, In Claim 1, delete "objects," and insert -- objects --, therefor.

Signed and Sealed this
Twentieth Day of November, 2012

David J. Kappos
*Director of the United States Patent and Trademark Office*